United States Patent [19]
Tateno

[11] Patent Number: 5,778,400
[45] Date of Patent: Jul. 7, 1998

[54] APPARATUS AND METHOD FOR STORING, SEARCHING FOR AND RETRIEVING TEXT OF A STRUCTURED DOCUMENT PROVIDED WITH TAGS

[75] Inventor: Masakazu Tateno, Nakai-machi, Japan

[73] Assignee: Fuji Xerox Co., Ltd., Tokyo, Japan

[21] Appl. No.: 605,795

[22] Filed: Feb. 22, 1996

[30] Foreign Application Priority Data

Mar. 2, 1995 [JP] Japan .................... 7-066727

[51] Int. Cl.$^6$ .................................................. G06F 17/30
[52] U.S. Cl. .................................................. 707/513; 707/2
[58] Field of Search .................................. 395/601–603, 395/612, 615, 774, 792, 793, 935; 707/1–3, 101, 104, 513

[56] References Cited

U.S. PATENT DOCUMENTS

| | | | |
|---|---|---|---|
| 4,803,643 | 2/1989 | Hickey | 395/774 |
| 5,557,722 | 9/1996 | DeRose et al. | 395/774 |
| 5,587,902 | 12/1996 | Kugimiya | 395/752 |

FOREIGN PATENT DOCUMENTS

| | | | |
|---|---|---|---|
| A-5-135054 | 6/1993 | Japan . | |
| 6119331 | 4/1994 | Japan | G06F 15/20 |
| 6-131340 | 5/1994 | Japan . | |
| 6-348756 | 12/1994 | Japan . | |

OTHER PUBLICATIONS

Mark Walter et al., "Status Report on SGML: notes from SGML '93," The Seybold Report on Publishing Systems, vol. 23 No. 9, Jan. 1994, pp. 3–13.

"EBT's DynaText: building an SGML–based viewer," The Seybold Report on Publishing Systems, vol. 22 No. 1, Sep. 1992, pp. 6–7.

Primary Examiner—Paul V. Kulik
Attorney, Agent, or Firm—Oliff & Berridge, PLC

[57] ABSTRACT

An apparatus and a method for efficiently searching through a tagged document for the location of a desired word in text using tags as reference units for search and retrieval, whereby any of the referenced words in the text is searched for and retrieved quickly. The apparatus comprises: a document inputting part for inputting a structured document including reference units delimited by tags; a dividing part for dividing into reference units the structured document input by the document inputting part; a word extracting part for extracting words from the reference units divided by the dividing part; a tuple generating part for generating tuples comprising the locations of the reference units divided by the dividing part and the words extracted by the word extracting part from the reference units; a search index generating part which, given the tuples generated by the tuple generating part out of the locations of the reference units and the words from the reference units, generates a search index comprising the words and the locations of the reference units including the words; and a storing part for storing the search index, generated by the search index generating part, in conjunction with the structured document input by the document inputting part.

10 Claims, 11 Drawing Sheets

```
<!ELEMENT DOCUMENT      —   CHAPTER*                                  >
<!ELEMENT CHAPTER       —   (TITLE, (PARAGRAPH|FIGURE)*, CHAPTER*)>
<!ELEMENT TITLE         00  (#PCDATA)                                 >
<!ELEMENT PARAGRAPH     -0  (#PCDATA)                                 >
<!ELEMENT FIGURE        -0  (TITLE, BODY OF FIGURE)                   >
<!ELEMENT BODY OF FIGURE -0 EMPTY                                     >
```

FIG.10

```
<DOCUMENT>
  <CHAPTER> WHAT IS SGML?
    <PARAGRAPH> THE SGML IS A SET OF INTERNATIONAL LINGUISTIC STANDARDS
    ESTABLISHED IN 1986 TO REGULATE THE EXPRESSIVE FORMATS OF COMPUTE-
    READY DOCUMENTS. THE STANDARD IS REFERRED TO AS ISO 8879.
    <PARAGRAPH> IN RECENT YEARS, THE SGML HAS GAINED WIDESPREAD ACCEPTANCE
    GLOBALLY AND IN THE UNITED STATES IN PARTICULAR.
  <CHAPTER> EXPRESSION OF SGML DOCUMENT
      <PARAGRAPH> THE SGML EXPRESSES A DOCUMENT STRUCTURE BY EMBEDDING IN
      TEXT TAGS CALLED START AND END TAGS
    <FIGURE> TYPICAL SGML DOCUMENT <BODY OF FIGURE>
    </CHAPTER>
  </CHAPTER>
</DOCUMENT>
```

FIG.11

```
<DOCUMENT>
  <CHAPTER><TITLE> WHAT IS SGML? </TITLE>
    <PARAGRAPH> THE SGML IS A SET OF INTERNATIONAL LINGUISTIC STANDARDS
    ESTABLISHED IN 1986 TO REGULATE THE EXPRESSIVE FORMATS OF COMPUTE-
    READY DOCUMENTS. THE STANDARD IS REFERRED TO AS ISO 8879. </PARAGRAPH>
    <PARAGRAPH> IN RECENT YEARS, THE SGML HAS GAINED WIDESPREAD ACCEPTANCE
    GLOBALLY AND IN THE UNITED STATES IN PARTICULAR. </PARAGRAPH>
    <CHAPTER><TITLE> EXPRESSION OF SGML DOCUMENT </TITLE>
      <PARAGRAPH> THE SGML EXPRESSES A DOCUMENT STRUCTURE BY EMBEDDING IN
      TEXT TAGS CALLED START AND END TAGS. </PARAGRAPH>
      <FIGURE><TITLE> TYPICAL SGML DOCUMENT </TITLE><BODY OF FIGURE>
      </BODY OF FIGURE><FIGURE>
    </CHAPTER>
  </CHAPTER>
</DOCUMENT>
```

APPARATUS AND METHOD FOR STORING, SEARCHING FOR AND RETRIEVING TEXT OF A STRUCTURED DOCUMENT PROVIDED WITH TAGS

BACKGROUND OF THE INVENTION

1. Field of the Invention

The present invention relates to an apparatus and a method for searching through structured documents and, more particularly, to an apparatus and a method for storing the words constituting the text of a structured document provided with tags and for efficiently searching for and retrieving any of the words thus stored.

2. Description of the Related Art

With conventional document editing apparatuses operating on a workstation (such as a word processor), attempts have been made to structure documents for efficient document preparation. Specifically, the content of each document is partially divided in advance using tags into a plurality of such document elements as headings and paragraphs. The relationship between these elements is properly defined so as to structure the document for subsequent editing.

One such structured type of documents is stipulated as the ODA (Open Document Architecture) under ISO 8613 and another structured document type as the SGML (Standard Generalized Markup Language) under ISO 8879. A document retrieval method disclosed in Japanese Patent Laid-Open No. Hei 5-135054 (1993) involves the use of structured documents complying with the ODA standards.

SGML-based structured documents are highly compatible with conventional text processing systems and have gained widespread acceptance globally and in the United States in particular; SGML is already at the stage of practical application. Structuring documents in compliance with the SGML involves the use of tags called marks inserted into document text so as to divide the text partially (e.g., into document elements). The relationship between such document divisions is defined appropriately to represent a tree-type document structure.

Below is a description of how SGML-based structured documents furnished with tags are typically processed. In order for documents to be structured in SGML, a structural prototype is provided in advance. The structure of documents is constrained within the scope of the prototype thus furnished. Under the SGML standards, the document structure prototype is called the document type definition (DTD).

In the DTD, each of the elements making up a document is equipped with a generic identifier for identification purposes. In structured documents, these generic identifiers serve as tags that designate the beginning and the end of each element. In other words, a tag is a DTD-defined generic identifier.

To structure a document in SGML requires first defining its document type. Marks called tags are then inserted into the text of the document to express its structure. The tags are used to divide partially the document text. For example, a paragraph of the document is expressed using a tag called <paragraph>, as follows:

<paragraph> This is a paragraph. </paragraph>

In the above example, the tag <paragraph> stands for the beginning of the paragraph and is called a start tag. Another tag </paragraph> denotes the end of the paragraph and is called an end tag. That is, the example above shows a paragraph marked with the start tag <paragraph> and the end tag </paragraph>, distinguished partially as an element of the document text. The text portion flanked by the two tags represents a partial content of the tag-designated document structure.

Tags have their proper names and are thereby distinguished from one another. Within a document, these tags have their structural locations defined by the DTD. In that sense, the tags express the structure (i.e., elements) of the document. Thus unless otherwise noted to avoid confusion, the structure of the SGML-based structured document is considered synonymous with the tags in the specification that follows.

In the SGML-based structured document (hereinafter called the SGML document), some tags may be omitted. Whether or not a given tag is omissible is designated by the DTD. The omission of a start tag and that of an end tag may be designated independently from each other. Illustratively, the end tag </paragraph> is omissible when so designated within the DTD. In that case, the example shown earlier may be rewritten to:

<paragraph> This is a paragraph.

A typical example of an SGML document in its DTD format is shown in FIG. 10. The document structure defined by a document type definition (DTD) 100 in FIG. 10 stipulates that a start tag named "title," an end tag "theme," an end tag "paragraph," an end tag "figure" and an end tag "body of figure" are omissible.

The content of the DTD 100 in FIG. 10 is further described below in more detail. The DTD here is described according to the SGML notation and is thus interpreted according thereto. Specifically, the first symbols "<!" on each line of the DTD content constitute a markup declaration delimiter. The word "ELEMENT" following the markup declaration delimiter without blank is an element declaration keyword. The first delimiter and element "<!ELEMENT" designate how the content of the structure (i.e., subordinate structure) is to be determined by the subsequent description. The names given to the items that follow (document, chapter, title, paragraph, figure, etc.) represent the names of the tags for these items.

The ensuing symbols ("——," "—O," "O O," etc.) indicate whether or not the start and end tags, in that order, of the respective items are omissible. The symbol "—" indicates that the tag cannot be omitted and the symbol "O" shows that the tag may be omitted. For example, the symbols "—O" for a given item indicate that the end tag is omissible but the start tag is not.

The next item is a definition of the rules representing the subordinate structure of the corresponding tag. The symbol "," means that the subsequent items (i.e., tags) appear in order. The symbol "I" indicates whichever of the items in question may be selected for use. The symbol "*" denotes zero or more times of repetition. The symbol "?" means that the use of the item in question is optional.

For example, if the subordinate structure of a tag is defined as "(chapter title, paragraph*, chapter*)," it means a subordinate structure wherein a paragraph is repeated zero or more times after the chapter title, followed by a chapter repeated zero or more times. Furthermore, if the subordinate structure of a tag is defined as "(title, (paragraphlfigure)*, chapter*)," as on the second line of the DTD 100 in FIG. 10, it means a subordinate structure wherein a paragraph or figure is repeated zero or more times after the title, followed by a chapter repeated zero or more times.

A tag subordinate structure "#PCDATA" on the third and fourth lines is one of the reserved words in the SGML. This reserved word means that the content of the structural definition is character data. Thus in the case of the DTD 100 in FIG. 10, the reserved word stipulates that character data comes below the tags "title" and "paragraph" constituting the chapter.

In the document structure prototype defined by the DTD of FIG. 10, the document in question begins with the start tag "<document>" and comprises repeated chapters. Each of the chapters includes a title followed by a "paragraph" or "figure" repeated zero or more times, which in turn is followed by a "chapter" again repeated zero or more times. The titles and paragraphs are composed of character data.

More specifically, the content of the "figure" in the structured document is made up of a "title" and a "body of figure" that follows it. The "body of figure" refers illustratively to an external image file and is thus defined as having no subordinate structure ("EMPTY"). Whether or not the tags are omissible in this structure is defined as follows: no tags are omissible for the "document" and "chapter"; the end tag alone is omissible for the "paragraph," "figure" and "body of figure"; and the start and end tags are omissible for the "title."

A representative actual document in compliance with the above DTD (that document is called a target document hereunder) is illustratively shown in FIG. 11 as an SGML document 110. In the document of FIG. 11, the indentation is made to vary with the structural depth of the document. This kind of indentation is provided to facilitate the explanation of and the understanding about the structured document. In practice, such indentation is often omitted.

A look at the SGML document 110 (a typical structured document) in FIG. 11 lets one understand that neither the start tag nor the end tag for the subordinate structure "title" of the "chapter" appears in this document. In fact, a start tag "<title>" is omitted between the tag "<chapter>" in the second line on the one hand, and its content "What is SGML?" on the other. Whether or not such a tag is omitted can only be known by referring to the DTD 100. That is, the exact structure of the target document can be read only in conjunction with the DTD furnished thereto.

Because of such tag omissions, an attempt to process an SGML document requires initially analyzing the document structure (i.e., syntax analysis by the SGML parser). In analyzing the structure of the target document, the parser refers to the DTD primarily to restore the tags omitted from that document. During syntax analysis of an actual document, other kinds of processing are also carried out (e.g., restoration of attributes, development of entities).

Suppose that the SGML document of FIG. 11 is subjected to the process of restoring tags (i.e., structure). The process results in an SGML document 120 of FIG. 12. In the SGML document 120, the underlined parts indicate restored tags (structure). This target document is acquired by referring to the DTD 100 and thereby restoring the omitted tags. Specifically, under the rules defining the "chapter" structure, the tag <title> must exist after the tag <chapter> and thus the tag <title> is restored following the tag <chapter>. Similarly, the tag <title> must exist after the tag <figure> and thus the tag <title> is restored following the tag <figure>. Because each end tag is omitted, the respective end tags are restored after the contents (</title>, </paragraph>, etc., before the next corresponding tag). In this manner, the omitted tags (structure) are restored as shown underlined.

With the tags restored as described to represent the SGML document 120 structurally, the document structure is searched through in the manner described below. In editing a structured document, major processing is not limited to searching through text character strings; a search through the document structure is also important. The reason for this is that during processing of structured documents, editing is actively performed through the use of the document structure.

In searching through a structured document, the conventional search through character strings is thus supplemented by the effective use of the document structure for search purposes. For example, if an SGML-related figure needs to be retrieved from within a document, the conventional process involves searching through the entire document (i.e., character string search) to find and retrieve the character string "related figure" from the text.

By contrast, if the structure of a structured document is used for search purposes, it is possible to search for structural features such as "a figure whose title includes SGML" and "a title as the subordinate structure of a figure," whereby the scope of search and retrieval is narrowed down. Because of the limited scope for search and retrieval as per the document structure, the efficiency of the process is enhanced.

As described, SGML documents have a tag-embedded architecture wherein text is simply marked. As such, SGML documents are highly compatible with conventional text processing systems. Because their structure is simply expressed by marked tags, the SGML documents require no specialized apparatus or programs when structurally searched through. The conventional character string search function may be utilized to search through tag character strings and hence through the document structure. In other words, conventional text processing systems (e.g., document editor) may create SGML documents. The documents thus created are structurally searched through by use of the conventional text searching method (for character string search) adapted to the search through tag character strings.

Tagged documents, notably those in SGML format, are becoming standard today and finding their way into many fields and applications. The tagged documents are documents that express in tags the markups representing format information and other document-related structural information. Because the contents of these documents are structured according to common SGML standards, it is easy to use the contents for widespread interchanges. This kind of documents has started circulating extensively in and out of business offices, government offices, schools and other institutions. When such tagged documents are electronically processed and accumulated, massive resources of electronic documents will be built up and become available for widespread use.

However, there exist problems with the above kind of document architecture. When necessary information is to be retrieved from tagged documents such as SGML documents, structural search is readily executed by use of tags but textual search is still limited to the conventional full text search or the like. That is, the contents of the documents are not yet to be searched through as efficiently as their structure. Since the use of tags allows the locations of structural portions in the document structure to be identified, such tags may be utilized as delimiters of reference units for search and retrieval. This arrangement will allow the contents of documents to be retrieved and utilized more efficiently than before.

SUMMARY OF THE INVENTION

It is therefore an object of the present invention to overcome the above and other deficiencies and disadvantages of the prior art and to provide an apparatus and a method for efficiently searching through a tagged document for the location of a desired word in text using the tags as reference units for search and retrieval, whereby any of the referenced words in the text is searched for and retrieved with efficiency.

In carrying out the invention and according to one aspect thereof, there is provided a structured document searching apparatus comprising: document inputting means for inputting a structured document including reference units delimited by tags; dividing means for dividing into reference units the structured document input by the document inputting means; word extracting means for extracting words from the reference units divided by the dividing means; tuple generating means for generating tuples comprising the locations of the reference units divided by the dividing means and the words extracted by the word extracting means from the reference units; search index generating means which, given the tuples generated by the tuple generating means out of the locations of the reference units and the words from the reference units, generates a search index comprising the words and the locations of the reference units including the words; and storing means for storing the search index generated by the search index generating means, in conjunction with the structured document input by the document inputting means.

In a preferred structure according to the invention, the structured document searching apparatus further comprises searching means which, when a target word is input, searches for the target word through the words within the search index generated by the search index generating means; and displaying means which, when the searching means detects the target word in a reference unit, displays the content of the reference unit including the target word within the structured document stored by the storing means in conjunction with the search index, the display being made in accordance with the location of the reference unit comprising the target word.

According to another aspect of the invention, there is provided a structured document searching method for use with a structured document searching apparatus, the method comprising the steps of: (a) inputting a structured document including reference units delimited by tags; (b) dividing into reference units the structured document input in the step (a); (c) extracting words from the reference units divided in step (b); (d) generating tuples comprising the locations of the reference units divided in the step (b) and the words extracted in the step (c) from the reference units; (e) given the tuples generated in the step (d) out of the locations of the reference units and the words from the reference units, generating a search index comprising the words and the locations of the reference units including the words; and (f) storing the search index generated in the step (e), in conjunction with the structured document input in the step (a).

In a preferred structure according to the invention, the structured document searching method further comprises the steps of: (g) when a target word is input, searching for the target word through the words within the search index generated in the step (e); and (h) when the target word is detected in a reference unit in the step (g), displaying the content of the reference unit including the target word within the structured document stored in the step (f) in conjunction with the search index, the display being made in accordance with the location of the reference unit comprising the target word.

An embodiment of the inventive apparatus and method for searching through a structured document forms a search index illustratively by collecting the locations of all tags immediately before all words that appear in the text of the document in question. When a target word for search is input, the embodiment outputs a set of the locations of the tags found immediately before every target word that appears in the text. That is, when a tagged document uses its tags as delimiters of its reference units for search and retrieval, all words that appear in the document are preserved in the form of a search index in combination with the locations of the tags immediately before these words. Thus when any of the words in the document is designated as the target word, the embodiment makes it possible immediately to search for and retrieve the reference units which contain the target word and which are delimited by tags.

These and other objects, features and advantages of the invention will become more apparent upon a reading of the following description and appended drawings.

BRIEF DESCRIPTION OF THE DRAWINGS

FIG. 10 is a view of a representative document type definition (DTD) in SGML format;

FIG. 11 is a view of a typical tagged SGML document whose tags are omitted; and

FIG. 12 is a view of a typical SGML document whose omitted tags have been restored.

DESCRIPTION OF THE PREFERRED EMBODIMENTS

Figure 1:
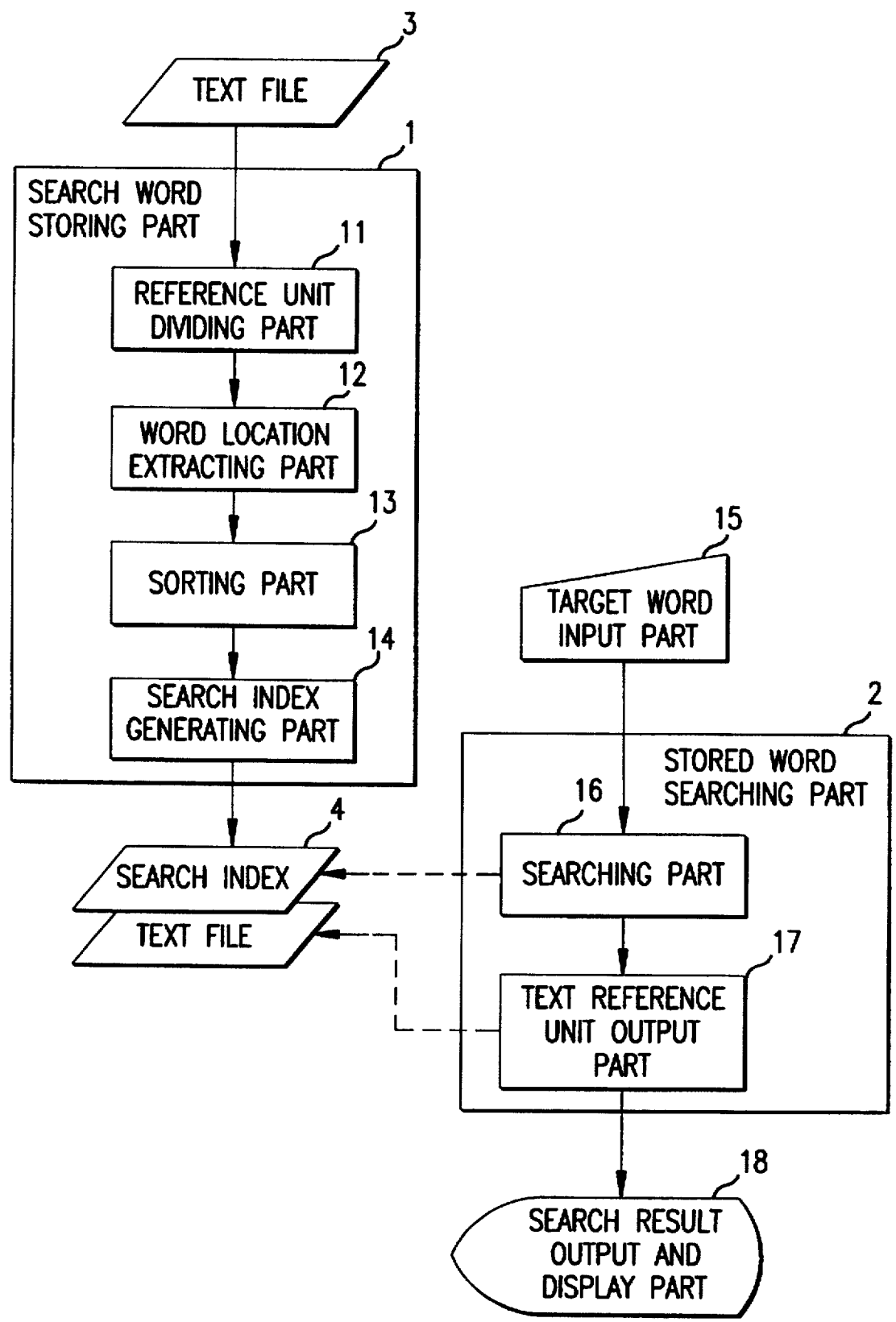
FIG. 1 is a block diagram outlining a structured document searching apparatus practiced as a first embodiment of the invention.

Preferred embodiments of the present invention will now be described with reference to the accompanying drawings. FIG. 1 is a block diagram showing major portions of a structured document searching apparatus practiced as the first embodiment. In FIG. 1, reference numeral 1 is a search word storing part; 2 is a stored word searching part 2; 3 is a text file of a tagged document; 4 is a search index attached to the text file; 11 is a reference unit dividing part; 12 is a word location extracting part; 13 is a sorting part; 14 is a search index generating part; 15 is a target word input part; 16 is a searching part; 17 is a text reference unit output part; and 18 is a search result output and display part.

Before the first embodiment allows any target word to be input for retrieval from text, the search word storing part 1 stores the words to be searched through from the text file 3 of a tagged document, thereby creating the search index 4 to be attached to the text file. With the search index 4 attached to the text file 3, the stored word searching part 2 searches for the target words in the text by use of the search index 4. This process will be described below in more detail with reference to FIG. 1.

The search word storing part 1 first enters the text file 3 of the tagged document into the reference unit dividing part 11. Given the text file 3, the reference unit dividing part 11 divides the text into reference units delimited by tags. The text divided into reference units is received by the word location extracting part 12. From the received text, the word location extracting part 12 extracts in pairs the location of each target word and the location of the reference unit in which that word appears.

The sorting part 13 then sorts by word the pairs of extracted words and reference unit locations, in order to generate sets of word locations having tuples comprising the locations of all reference units in which the target word appears, as will be explained later. Given the sets of word locations thus obtained, the search index generating part 14 generates the search index 4 allowing sets of locations to be acquired from words. The generated search index is added to the text file 3. Given the text file 3 equipped with the search index 4, the stored word searching part 2 searches through the index to acquire quickly the location of any reference unit delimited by tags in the text, whereby the content of the applicable reference unit is displayed immediately.

When the text file is to be searched through for a target word, the target word input part 15 first enters the target word into the stored word searching part 2. The searching part 16 then searches for the target word through the search index 4 attached to the text file, retrieving sets of the locations of reference units in which the target word appears. With the locations of the reference units searched for and retrieved, the text reference unit output part 17 immediately outputs the applicable reference unit by accessing the text file in accordance with the reference unit locations. The applicable reference unit is output and displayed by the search result output and display part 18.

As described, when the text file 3 of the tagged document is input to the reference unit dividing part 11 of the search word storing part 1, the reference unit dividing part 11 divides the text into reference units delimited by tags. That is, the reference unit dividing part 11 acquires the reference units and their locations out of the text file. The word location extracting part 12 receives the reference units as its input, and pairs all words included in the reference units with the locations of those reference units in which the words appear so as to prepare the word-location pairs. For each of the words involved, the sorting part 13 acquires word-location pairs (sets of words and reference unit locations), which are tuples of locations, in the locations of all reference units wherein the word in question appears. From all pairs (sets of words and reference unit locations), the search index generating part 14 generates a set of reference unit locations with respect to every word, whereby the search index 4 is prepared.

Every word in the document is thus stored in the search index 4 together with information about the location of the tag (reference unit) immediately before the word in question in the document. When a target word to be searched for and retrieved is supplied, a search through the search index 4 makes it possible immediately to retrieve the tag location of the reference unit applicable to that word in the document, whereby a partial content of the document is output and displayed at high speed in the form of a reference unit.

The partial content of the document represents specifically the reference unit that contains the target word to be searched for and retrieved. This is a document element sandwiched between the start tag immediately before the target word and the end tag completing that start tag. The reference units to be displayed are searched through in the direction opposite to that in which the start tag preceding each word in question is generally read. A given reference unit may thus be extracted by searching through end tags for that end tag which completes the start tag in question in the forward direction starting from the target word to be searched for and retrieved.

Figure 2:
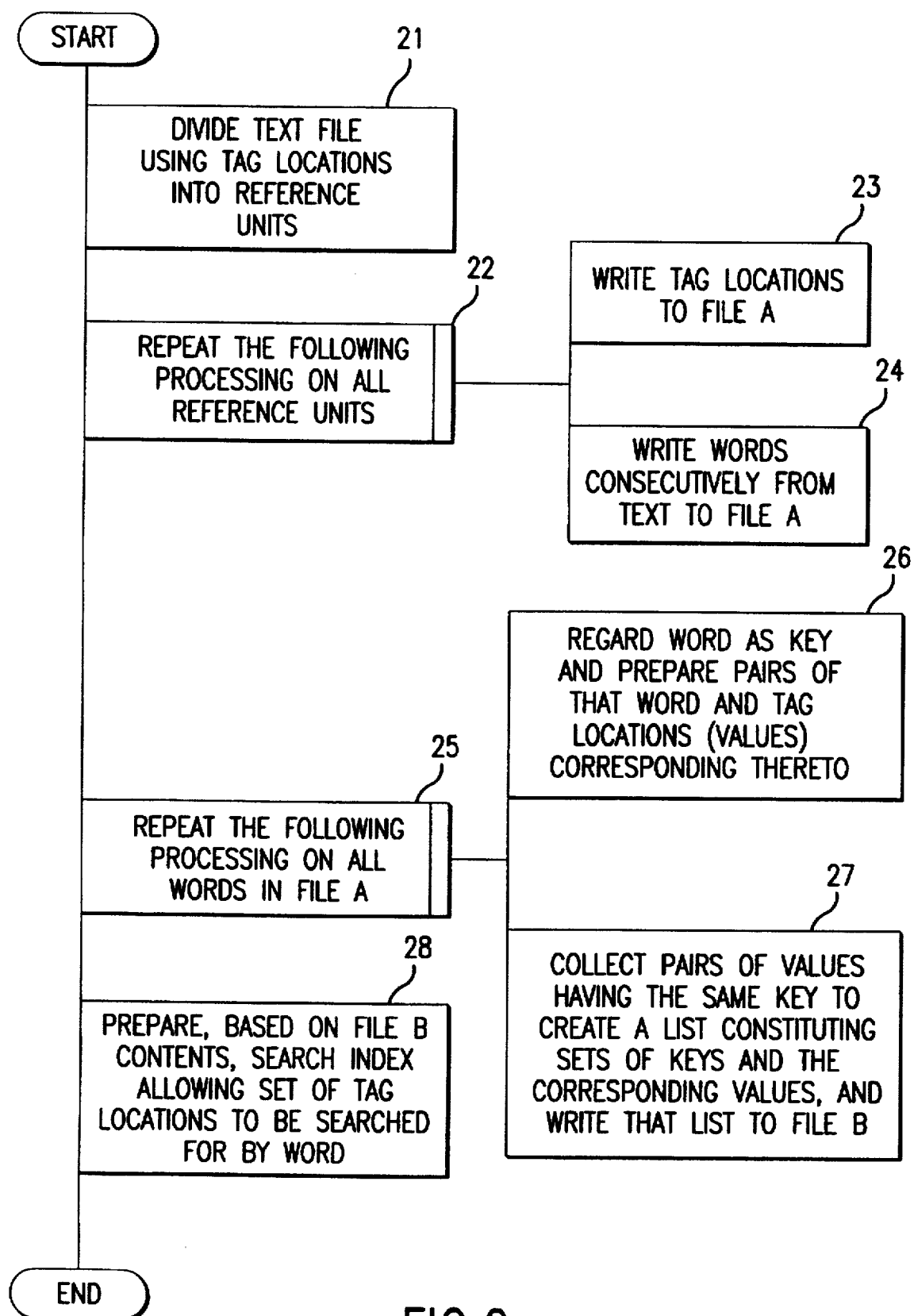
FIG. 2 is a problem analysis diagram (PAD) showing the flow of a process for preparing a search index of a text file through the use of the first embodiment.
Figure 3:
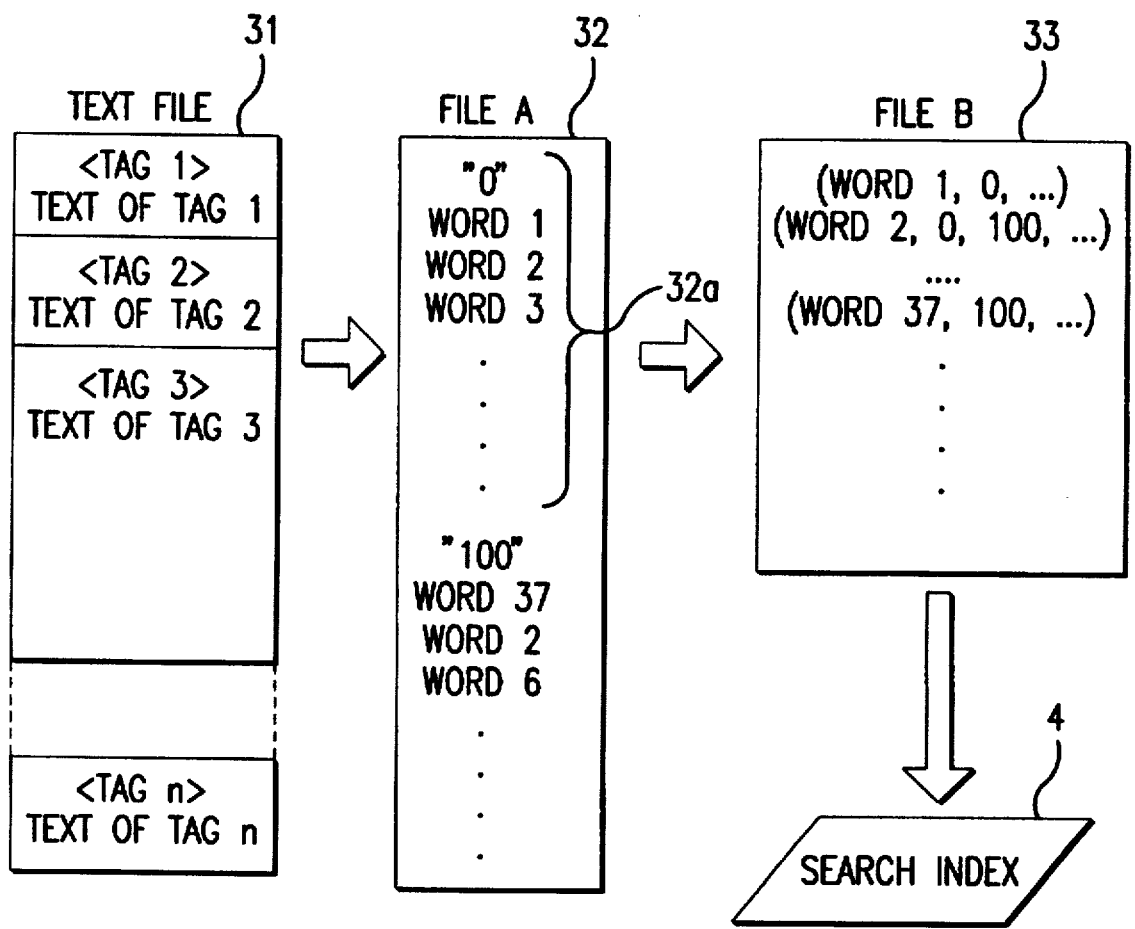
FIG. 3 is a view specifically illustrating major steps in the process of FIG. 2 for preparation of the search index.

FIG. 2 is a problem analysis diagram (PAD) showing the flow of the process for preparing a search index of a text file through the use of the first embodiment. FIG. 3 specifically indicates major steps in the process of FIG. 2 for preparation of the search index. Described below with reference to FIGS. 2 and 3 is how to prepare a typical search index using the first embodiment for searching through the stored words of a structured document.

The flow of the process for preparing a search index of a text file using the first embodiment will now be outlined with reference to FIG. 2. When the processing begins, a process block 21 is first reached. The block 21 divides a text file 31 into reference units using the locations of tags. After division of text into reference units, the tag locations are stored temporarily. Then a control block 22 is reached for repeated processing. The control block 22 causes subsequent process blocks 23 and 24 to be performed repeatedly on all tag locations and the tag-delimited text portions paired therewith.

Under control of the control block 22, the process block 23 writes to a file A the tag locations of the reference units to be processed. The process block 24 writes the words from the text of the applicable reference units consecutively to the file A following the previously written tag locations therein. That is, in the file A, each tag location is followed by consecutively written words from the text of each reference unit. Such processing is performed repeatedly on all reference units under control of the control block 22. As a result of this, as shown in FIG. 3, the tag location of each reference unit is first written to the file A from the text file 31. Each of the tag locations is followed consecutively by the words from the text of the reference unit corresponding to the tag location in question. This results in the file A 32 having a data content comprising as many tag locations along with the ensuing word tuples 32a as the number of the reference units involved.

After the file A has been created in the manner described, a control block 25 is reached for another repeat processing. Under control of the control block 25, subsequent process blocks 26 and 27 are carried out repeatedly on all words included in the file A.

In the repeat processing controlled by the control block 25, the process block 26 regards a given word as a key and prepares pairs of the key word and the tag locations (values) corresponding to that word. The process block 27 collects pairs of the values (tag locations) having the same key (word) in order to create a list of sets comprising the keys and their corresponding values. The list is written to a file B 33. The file B thus provides a list of each word associated with the tag location of each reference unit in which the word in question appears. Such processing is repeated on all words in the file A under control of the control block 25.

The result is that, as shown in FIG. 3, the file B 33 constitutes a list of every word associated with the tag locations of the reference units in which the word in question appears and which are delimited by tags in the text file. Specifically, the file B 33 in FIG. 3 comprises listed data in which a first word 1, a second word 2, etc., are listed as (word 1, 0, . . . )
(word 2, 0, 100, . . . )
. . .

The listed data signifies that the first word 1 appears in the reference units whose tag locations are given as addresses 0, . . . , that the second word 2 appears in the reference units whose tag locations are identified as addresses 0, 100, . . . , and so on.

Then a process block 28 is reached. The process block 28 prepares, on the basis of the content of the file B, a search index through which to search by word for a set of tag locations. This completes the processing of FIG. 2. When the search index for each word has been prepared in the manner described, a search through the search index for a given target word permits an immediate retrieval of the set of the tag locations of the reference units in which the target word appears. Thus given the set of the tag locations acquired according to the target word, it is possible to display the relevant reference units in accordance with the tag location set in question.

As described, the first embodiment of the invention first divides the text file into reference units using the locations of tags. When the tag locations identifying the reference units are retrieved and stored in conjunction with the words included in those reference units (in the file A), the file format involves first writing the tag location indicating the start of each reference unit, followed by the words that belong to that reference unit. Alternatively, each stored word may be provided with a field indicating the tag type so as to clarify the relationship between the word in question and the reference unit it belongs to (i.e., tag type), whereby words in the reference units of the same tag type are distinguished from one another. Under this alternative scheme, a reference unit of the same tag type may be used as a search unit. The scheme is implemented as the second embodiment of the invention, to be described below.

Figure 4:
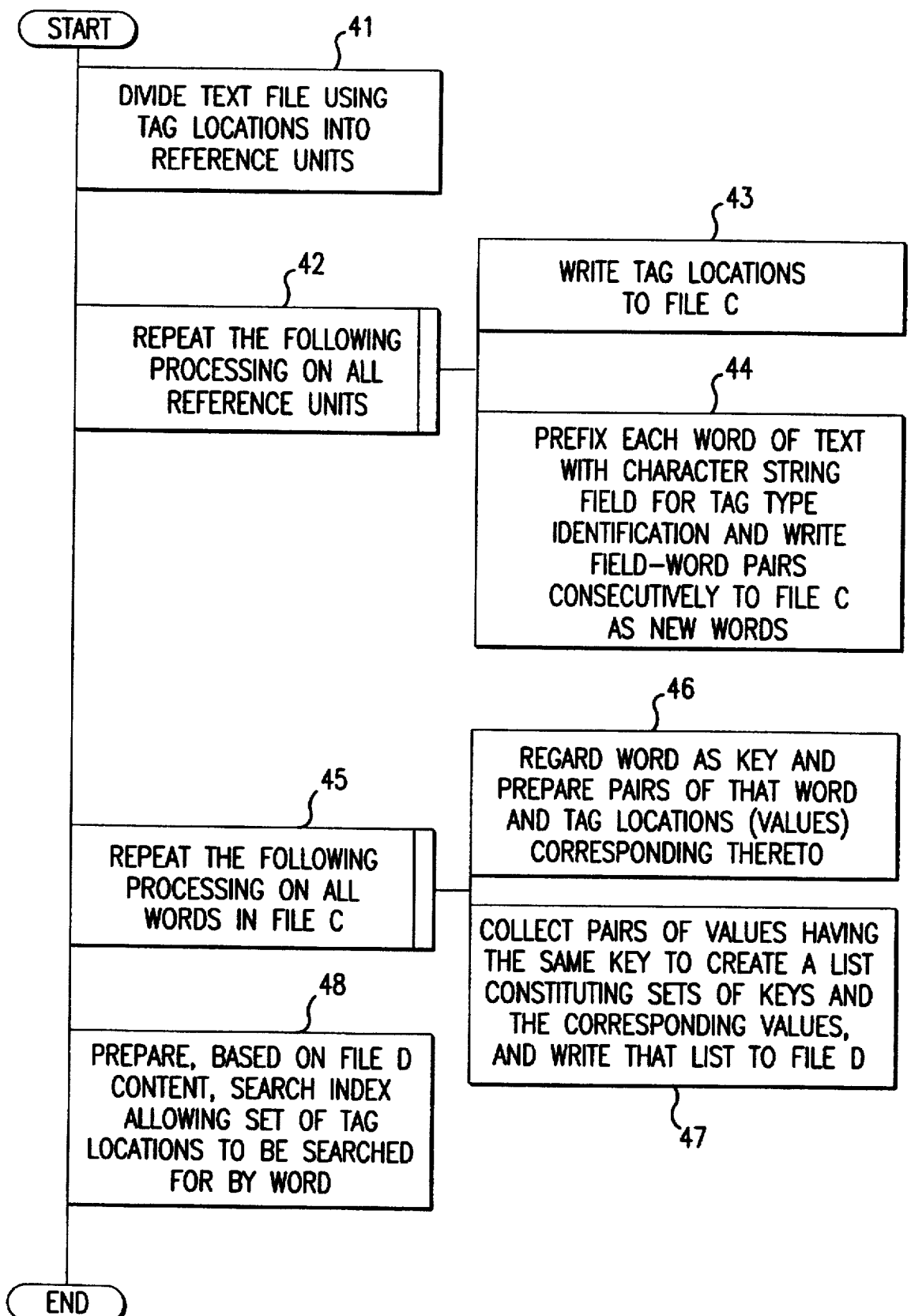
FIG. 4 is a PAD depicting the flow of a process for preparing a search index of a text file through the use of a structured document searching apparatus practiced as a second embodiment of the invention.
Figure 5:
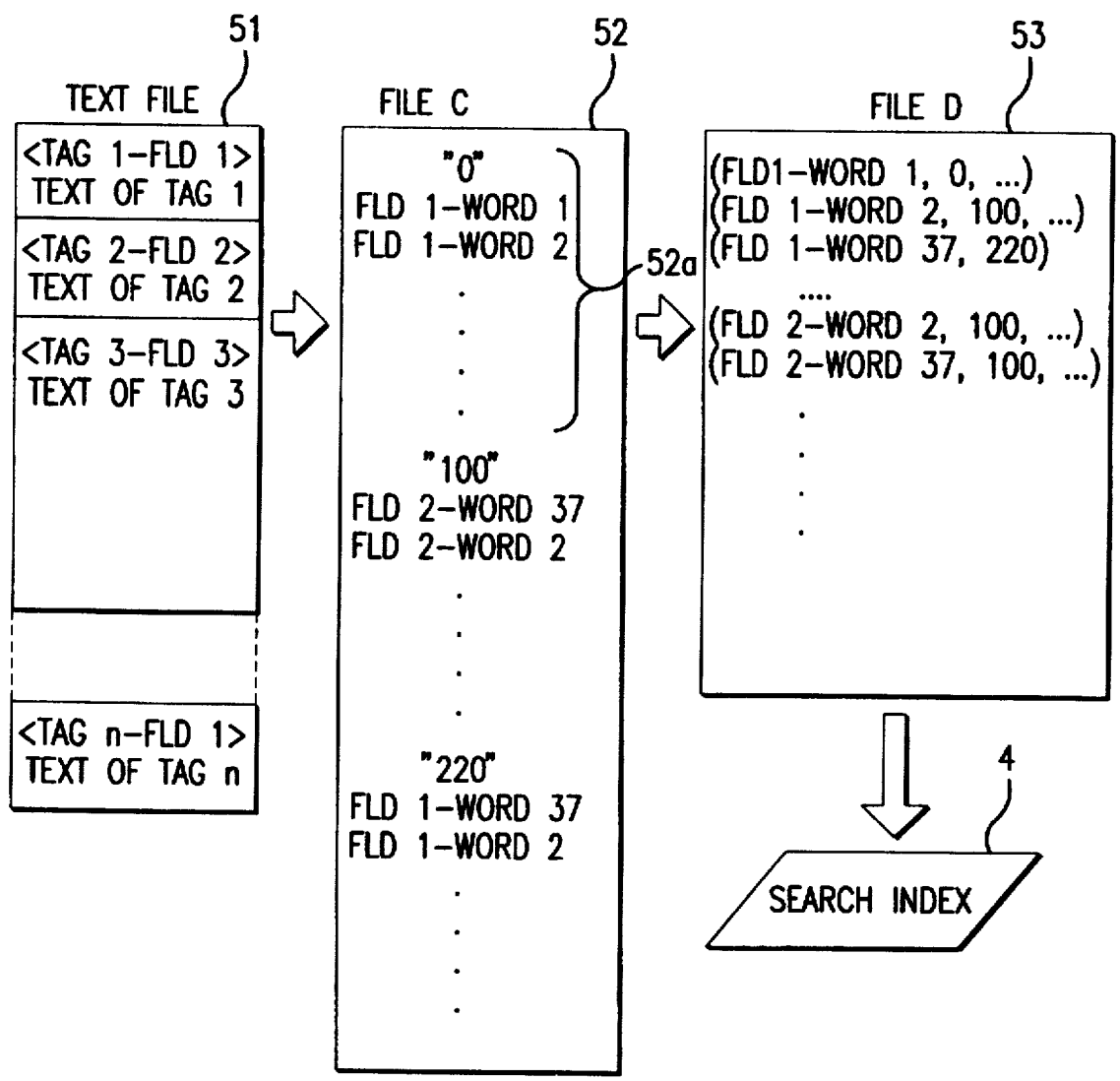
FIG. 5 is a view specifically illustrating major steps in the process of FIG. 4 for preparation of the search index.

FIG. 4 is a PAD depicting the flow of the process for preparing a search index of a text file through the use of a structured document searching apparatus practiced as the second embodiment. FIG. 5 specifically illustrates major steps in the process of FIG. 4 for preparation of the search index. Described below with reference to FIGS. 4 and 5 is how to prepare a typical search index using the second embodiment for searching through the stored words of a structured document.

With the second embodiment, the words to be searched through in the text of each reference unit are each provided with a character string field indicating the tag type. This is to ensure that any tag location resulting from the search by word permits immediate identification of the type of the tag delimiting a given reference unit to be displayed. The scheme is readily implemented illustratively by the word location extracting part performing an additional step to prefix each extracted word with a character string field identifying the corresponding tag type. A typical field for tag type identification may be a single record including three subordinate fields indicating the symptom, probable cause and remedy of a failure. In a document in which such records appear repeatedly, the fields may be used to limit the scope of search for and retrieval of a given word to, say, those fields indicating only symptoms. In this case, the character string field added to each word for tag field identification indicates symptom, probable cause or remedy of a failure.

The flow of the process for preparing a search index of a text file using the second embodiment will now be outlined with reference to FIG. 4. When the processing begins, a process block 41 is first reached. The block 41 divides the text file into reference units using the locations of tags. After division of text into reference units, the tag locations are stored temporarily. Then a control block 42 is reached for repeated processing. The control block 42 causes subsequent process blocks 43 and 44 to be performed repeatedly on all tag locations and the tag-delimited text portions paired therewith.

Under control of the control block 42, the process block 43 writes to a file C the tag locations of the reference units to be processed. The process block 44 prefixes each word from the text of the applicable reference units with a character string field for tag type identification and writes the field-word combinations consecutively to the file C as new words following the previously written tag locations therein. That is, in the file C, each tag location is followed by consecutively written words each supplemented by a character string field for tag type identification, the words been found in the text of each reference unit.

Such processing is performed repeatedly on all reference units under control of the control block 42. As a result of this, as shown in FIG. 5, the tag location of each reference unit is first written to the file C 52 from the text file 51. Each of the tag locations is followed consecutively by the words (word 1, word 2, etc.) from the text of the reference unit corresponding to the tag location in question, each word being prefixed with a character string field (fld 1 etc.) for tag type identification. This results in the file C 52 having a data content comprising as many tag locations, along with the ensuing word tuples 52a each made up of a word supplemented by a character string field for tag type identification, as the number of the reference units involved.

After the file C has been created in the manner described, a control block 45 is reached for another repeat processing. Under control of the control block 45, subsequent process blocks 46 and 47 are carried out repeatedly on all words included in the file C.

In the repeat processing controlled by the control block 45, the process block 46 regards a given word as a key and prepares pairs of the key word and the tag locations (values) corresponding to that word. The process block 47 collects pairs of the values (tag locations) having the same key (word) in order to create a list of sets comprising the keys and their corresponding values. The list is written to a file D. The file D thus provides a list of each word associated with the tag location of each reference unit in which the word in question appears. Under control of the control block 45, such processing is repeated on all words written to the file C.

The result is that, as shown in FIG. 5, the file D 53 constitutes a list of every word of the text file 51 associated with the tag locations of the reference units in which the word in question appears, each word being prefixed with a character string field for tag type identification. Specifically, the example of FIG. 5 comprises listed data in which a first word 1, a second word 2, etc., are listed as (fld 1-word 1, 0, . . . )
(fld 1-word 2, 0, 100, . . . )
. . .

The listed data signifies that the first word 1 appears in the reference units whose tag type is "fld 1" and whose tag locations are given as addresses 0. . . . . that the second word 2 appears in the reference units whose tag type is also "fld 1" and whose tag locations are identified as addresses 0, 100, . . . , and so on.

Then a process block 48 is reached. The process block 48 prepares, on the basis of the content of the file D, a search index through which to search by word for a set of tag locations (tag field names). This completes the processing of FIG. 4. When the search index for each word has been prepared in the manner described, a search through the search index for a designated tag type and a designated target word permits an immediate retrieval of the set of the tag locations of the reference units in which the target word appears and which are distinguished by tag type. Thus given the set of the tag locations acquired according to the target word, it is possible to display the relevant reference units in accordance with the tag location set in question.

As described, the second embodiment of the invention first divides the text file into reference units using tags. When the tag locations identifying the reference units that vary by tag type are retrieved and stored in conjunction with the words included in those reference units (in the file C), the file format involves first writing the tag location indicating the start of a given reference unit, followed by the words that belong to that reference unit, each word being prefixed with a character string field for tag type identification. The scheme permits a quick search for a target word through each of the tag-delimited reference units distinguished by tag type.

In a setup where a target word is to be searched for through the words of a structured document grouped into tag-delimited reference units, some of the stored words may each include the description of a pair made up of an attribute and a value. In such a case, the attribute-value pairs may also be stored as words to be searched through. Given these pairs as part of the stored words, it is possible to perform a high-speed search therethrough with tag locations used as reference units, as with the first embodiment. This scheme will be described below as a third embodiment of the invention.

The third embodiment is an embodiment of the invention in the form of another structured document searching apparatus that searches for a target word through the words of a structured document grouped into tag-delimited reference units. When some of the stored words each include the description of a pair made up of an attribute and a value, these attribute-value pairs are also stored as words to be searched through. A typical attribute-value pair is a specially formatted word such as {sales=100,000} in which a word is paired with a value and which is distinguished from other words.

Figure 6:
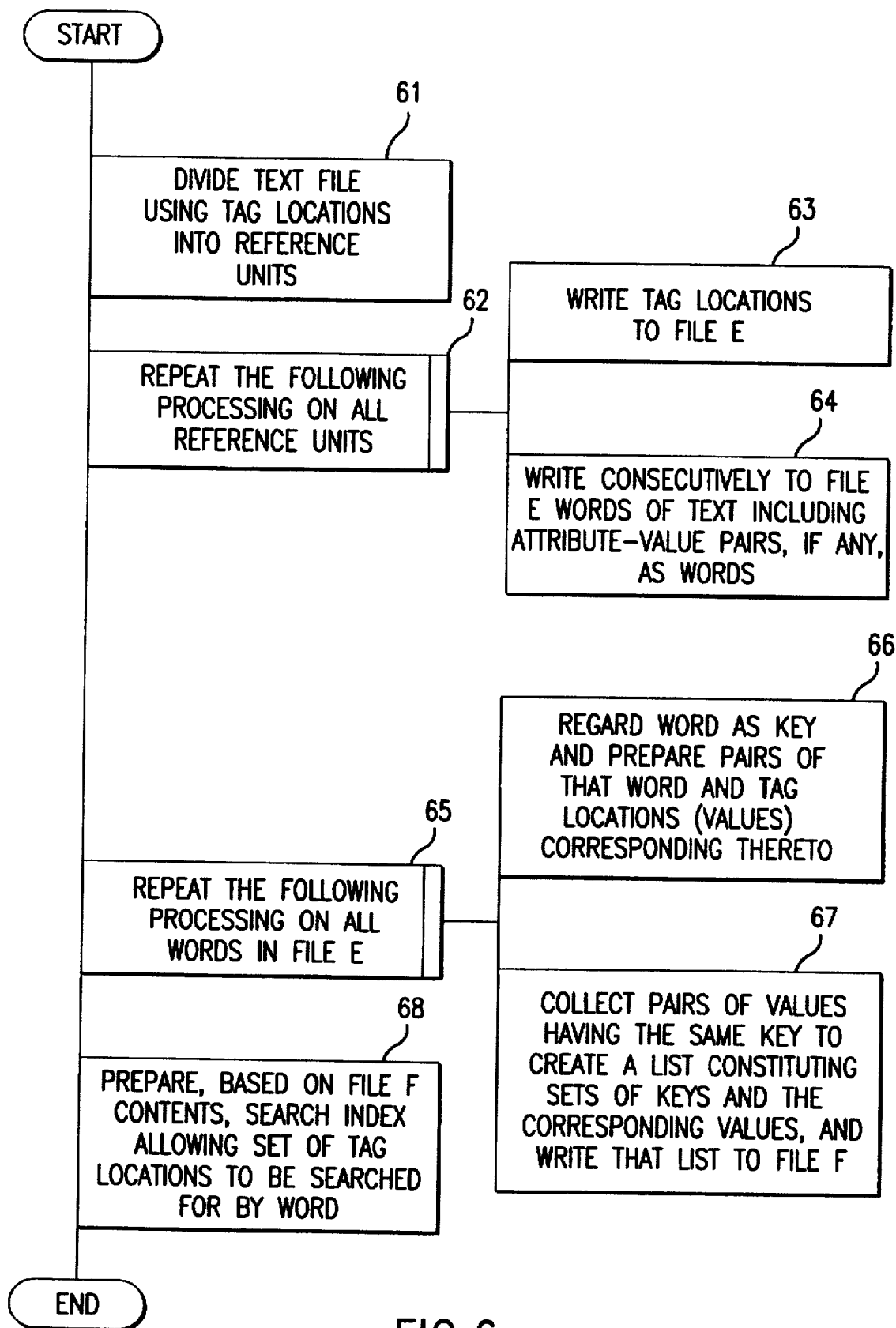
FIG. 6 is a PAD showing the flow of a process for preparing a search index of a text file through the use of a structured document searching apparatus practiced as a third embodiment of the invention.
Figure 7:
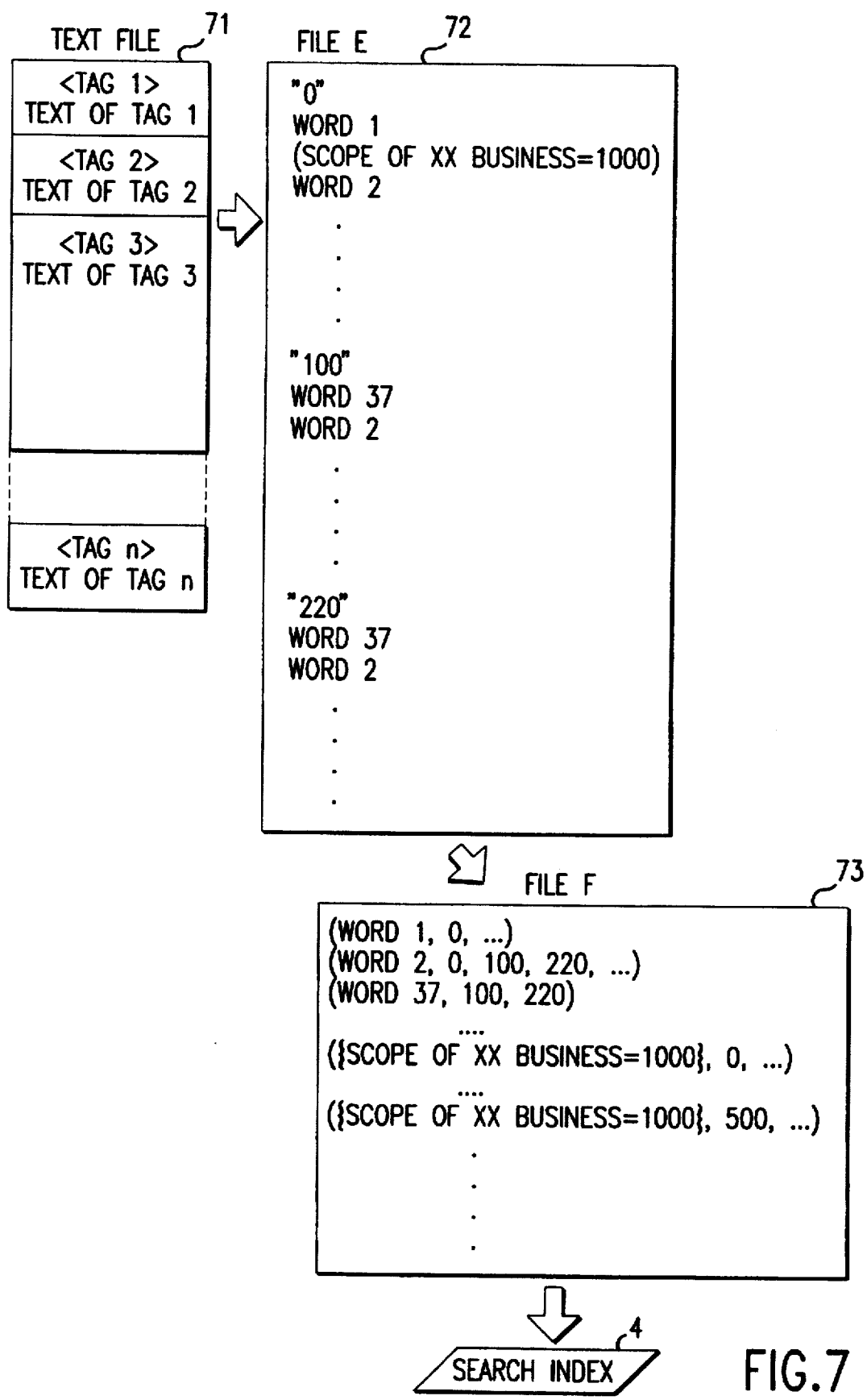
FIG. 7 is a view specifically depicting major steps in the process of FIG. 6 for preparation of the search index.

FIG. 6 is a PAD showing the flow of a process for preparing a search index of a text file through the use of the third embodiment of the invention. FIG. 7 specifically depicts major steps in the process of FIG. 6 for preparation of the search index. Described below with reference to FIGS. 6 and 7 is how to prepare a typical search index using the third embodiment for searching through the stored words of a structured document.

The flow of the process for preparing a search index of a text file using the third embodiment will now be outlined with reference to FIG. 6. When the processing begins, a process block 61 is first reached. The block 61 divides the text file into reference units using the locations of tags. After division of text into reference units, the tag locations are stored temporarily. Then a control block 62 is reached for repeated processing. The control block 62 causes subsequent process blocks 63 and 64 to be performed repeatedly on all tag locations and the tag-delimited text portions (reference units) paired therewith.

Under control of the control block 62, the process block 63 writes to a file E the tag locations of the reference units to be processed. The process block 64 writes the words from the text of the applicable reference units consecutively to the file E following the previously written tag locations therein. If any word comprises the description of a pair constituted by an attribute and a value, such words are also written consecutively to the file E as words. That is, in the file E, each tag location is followed by consecutively written words from the text of each reference unit, the words including those made up of attribute-value pairs wherever they are encountered. Such processing is performed repeatedly on all reference units under control of the control block 62.

As a result of the processing above, as shown in FIG. 7, the tag location of each reference unit is first written to the file E 72 from the text file 71. Each of the tag locations is followed consecutively by the words from the text of the reference unit corresponding to the tag location in question, as well as by the attribute-value pairs if they occur. As with the second embodiment, this forms the file E 72 having a data content comprising as many tag locations, along with the ensuing words and attribute-value pairs, as the number of the reference units involved.

After the file E has been created in the manner described, a control block 65 is reached for another repeat processing. Under control of the control block 65, subsequent process blocks 66 and 67 are carried out repeatedly on all words (including attribute-value pairs) contained in the file E.

In the repeat processing controlled by the control block 65, the process block 66 regards a given word as a key and prepares pairs of the key word and the tag locations (values) corresponding to that word. The process block 67 collects pairs of the values (tag locations) having the same key (word) in order to create a list of sets comprising the keys and their corresponding values. The list is written to a file F. The file F thus provides a list of each word associated with the tag location of each reference unit in which the word in question appears. Such processing is repeated on all words (including attribute-value pairs) in the file E under control of the control block 65.

The result is that, as shown in FIG. 7, the file F 73 constitutes a list of every word (including any attribute-value pair that may occur) associated with the tag locations of the reference units in which the word in question appears. Specifically, the file F 73 in FIG. 7 comprises listed data in which a first word 1, a second word 2, etc., are listed as (word 1, 0, . . . )

(word 2, 0, 100, 220, . . . )

. . .

The listed data signifies that the first word 1 appears in the reference units whose tag locations are given as addresses 0, . . . , that the second word 2 appears in the reference units whose tag locations are identified as addresses 0, 100, 220, . . . , and so on. For attribute-value pairs, as with words, the file F lists data comprising ({scope of xx business=1,000}, 0, . . . )

which signifies that the attribute-value pair {scope of xx business=1,000} appears in the reference units whose tag locations are given as addresses 0, etc.

Then a process block 68 is reached. The process block 68 prepares, on the basis of the content of the file F, a search index through which to search by word for a set of tag locations. This completes the processing of FIG. 6. When the search index for each word has been prepared in the manner described, a search through the search index for a given target word permits, as with the preceding embodiment, a quick retrieval of the set of the tag locations of the reference units in which the target word appears. If an attribute-value pair is designated to be searched for and retrieved, the scheme above also permits an immediate retrieval of the set of the tag locations of the reference units in which the target attribute-value pair appears. Thus given the set of the tag locations acquired according to the target word, it is possible to display the relevant reference units in accordance with the tag location set in question.

With the second embodiment, as described, each stored word is prefixed with a character string field for tag type identification. With the third embodiment, pairs of attributes and their corresponding values are regarded as words that are stored in addition to the ordinary words. The two features may be combined into a fourth embodiment of the invention, which will be described below.

The fourth embodiment is an embodiment of the invention in the form of yet another structured document searching apparatus that searches for a target word through the words of a structured document grouped into tag-delimited reference units. When some of the stored words each include the description of a pair made up of an attribute and a value, these attribute-value pairs are also stored as words to be searched through. Furthermore, each of the stored attribute-value pairs is prefixed with a character string field for tag type identification.

Figure 8:
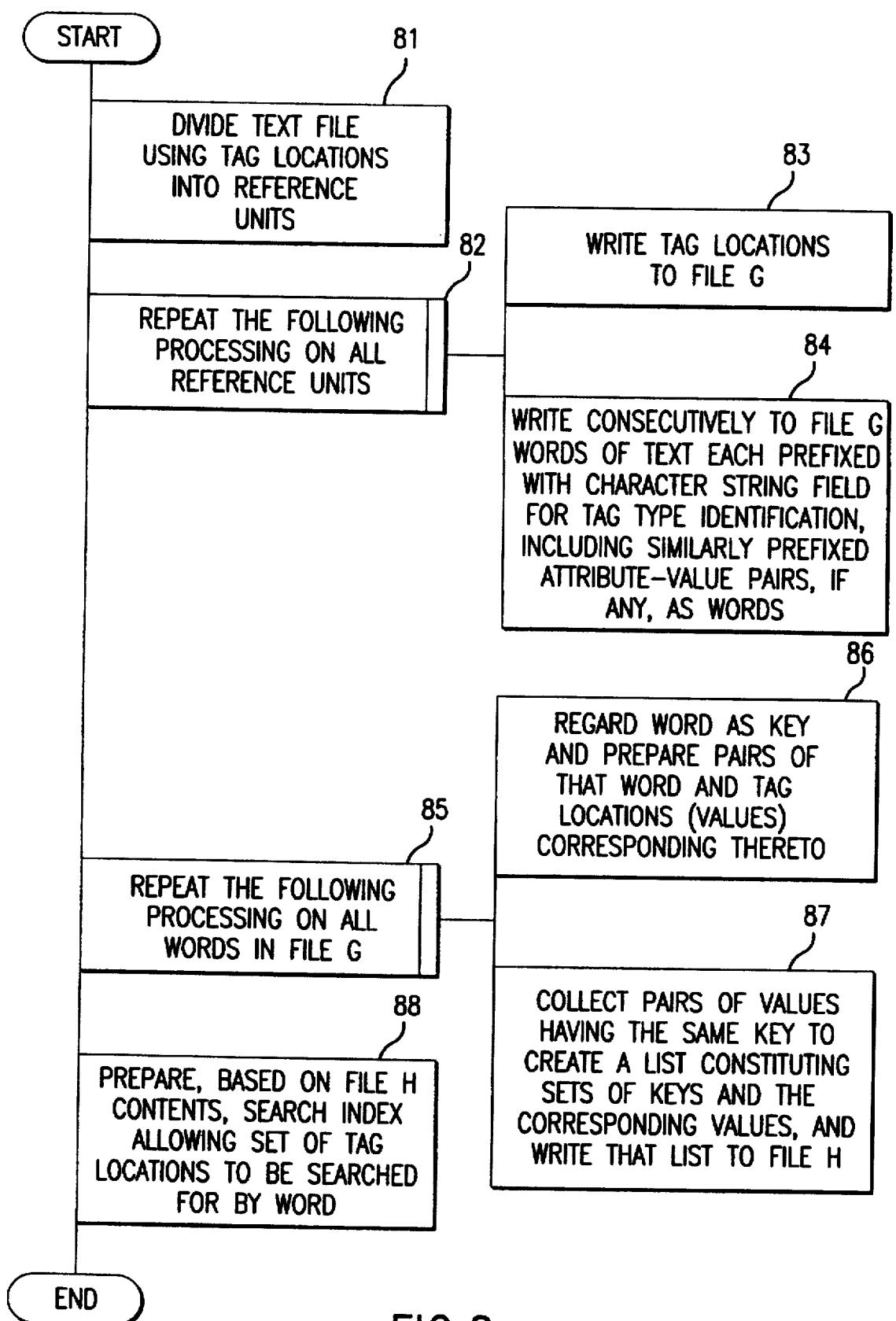
FIG. 8 is a PAD indicating the flow of a process for preparing a search index of a text file through the use of a structured document searching apparatus practiced as a fourth embodiment of the invention.
Figure 9:
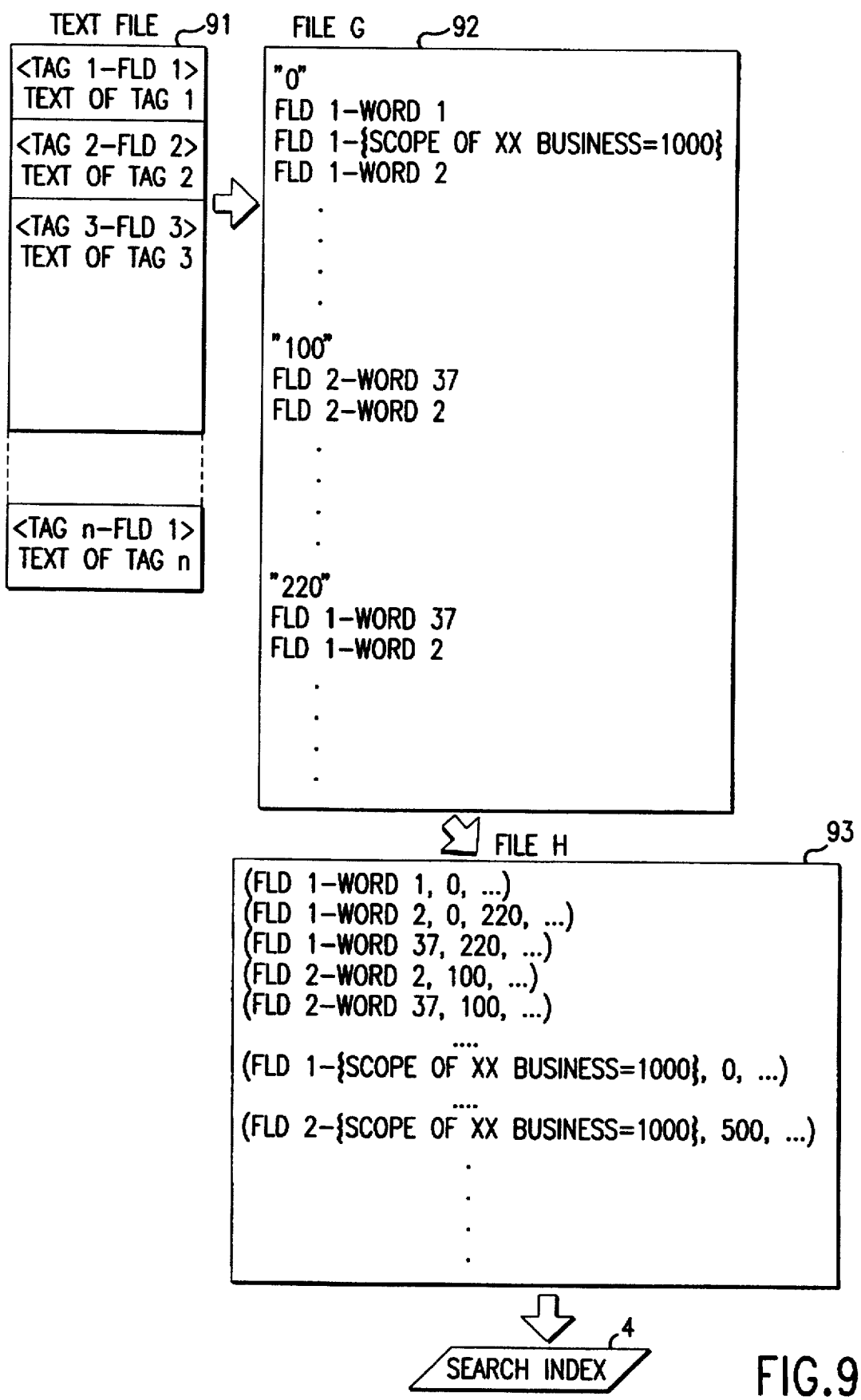
FIG. 9 is a view specifically presenting major steps in the process of FIG. 8 for preparation of the search index.

FIG. 8 is a PAD indicating the flow of a process for preparing a search index of a text file through the use of the fourth embodiment of the invention. FIG. 9 specifically presents major steps in the process of FIG. 8 for preparation of the search index. Described below with reference to FIGS. 8 and 9 is how to prepare a typical search index using the fourth embodiment for searching through the stored words of a structured document.

With the fourth embodiment, the words (including attribute-value pairs) to be searched through in the text of each reference unit are each provided with a character string field indicating the tag type. This is to ensure that any tag location resulting from the search by word or by attribute-value pair permits immediate identification of the type of the tag delimiting a given reference unit to be displayed. As described, this scheme is readily implemented illustratively by the word location extracting part performing an additional step to prefix each extracted word with a character string field identifying the corresponding tag type.

The flow of the process for preparing a search index of a text file using the fourth embodiment will now be outlined with reference to FIG. 8. When the processing begins, a process block 81 is first reached. The block 81 divides the text file into reference units using the locations of tags. After division of text into reference units, the tag locations are stored temporarily. Then a control block 82 is reached for repeated processing. The control block 82 causes subsequent process blocks 83 and 84 to be performed repeatedly on all tag locations and the tag-delimited text portions paired therewith.

Under control of the control block 82, the process block 83 writes to a file G the tag locations of the reference units to be processed. The process block 84 prefixes each word from the text of the applicable reference units with a character string field for tag type identification and writes the field-word combinations consecutively to the file G as new words following the previously written tag locations therein. If descriptions of attribute-value pairs are encountered, these pairs are regarded as words and are also written consecutively to the file G. That is, in the file G, each tag location is followed by consecutively written words and/or attribute-value pairs each supplemented by a character string field for tag type identification, the words and/or pairs been found in the text of each reference unit.

Such processing is performed repeatedly on all reference units under control of the control block 82. As a result of this, as shown in FIG. 9, the tag location of each reference unit is first written to the file G 92 from the text file 91. Each of the tag locations is followed consecutively by the words and/or attribute-value pairs from the text of the reference unit corresponding to the tag location in question, each word and/or pair being prefixed with a character string field for tag type identification. This results in the file G 92 having a data content comprising as many tag locations, along with the ensuing tuples of words and/or attribute-value pairs each prefixed with a character string field for tag type identification, as the number of the reference units involved.

After the file G has been created in the manner described, a control block 85 is reached for another repeat processing. Under control of the control block 85, subsequent process blocks 86 and 87 are carried out repeatedly on all words (including attribute-value pairs) contained in the file C.

In the repeat processing controlled by the control block 85, the process block 86 regards a given word (or an attribute-value pair) as a key and prepares pairs of the key word and the tag locations (values) corresponding to that word. The process block 87 collects pairs of the values (tag locations) having the same key (word or attribute-value pair) in order to create a list of sets comprising the keys and their corresponding values. The list is written to a file H. The file H thus provides a list of each word prefixed with a character string field for tag type identification and associated with the tag location of each reference unit in which the word in question appears. Under control of the control block 85, such processing is repeated on all words (including attribute-value pairs) written to the file G.

The result is that, as shown in FIG. 9, the file H 93 constitutes a list of every word of the text file 51 associated with the tag locations of the reference units in which the word in question appears, each word being prefixed with a character string field for tag type identification. Specifically, the file H 93 in FIG. 5 comprises listed data in which a first word 1, a second word 2, etc., are listed as (fld 1-word 1, 0, . . . )

(fld 1-word 2, 0, 220, . . . )

. . .

The listed data signifies that the first word 1 appears in the reference units whose tag type is "fld 1" and whose tag locations are given as addresses 0, . . . . that the second word 2 appears in the reference units whose tag type is also "fld 1" and whose tag locations are identified as addresses 0, 220, . . . . and so on. For attribute-value pairs, as with words, the file H lists data comprising (fld 1-{scope of xx business=1,000}, 0, . . . )

which signifies that the attribute-value pair {scope of xx business=1000} appears in the reference units whose tag type is "fld 1" and whose tag locations are given as addresses 0, etc.

Then a process block 88 is reached. The process block 88 prepares, on the basis of the content of the file H, a search index through which to search by word for a set of tag locations (tag field names). This completes the processing of FIG. 8. When the search index for each word has been prepared in the manner described, a search through the search index for a designated tag type and a designated target word or attribute-value pair permits an immediate retrieval of the set of the tag locations of the reference units in which the target word or attribute-value pair appears and which are distinguished by tag type. Thus given the set of the tag locations acquired according to the target word or attribute-value pair, it is possible to display the relevant reference units in accordance with the tag location set in question.

As described and according to the inventive apparatus and method for searching through a structured document, a search index is formed illustratively by collecting the locations of all tags immediately before all words that appear in the text of the document in question. When a target word for search is input, the embodiment of the invention outputs a set of the locations of the tags found immediately before every target word that appears in the text. That is, when a tagged document uses its tags as delimiters of its reference units for search and retrieval, all words that appear in the document are preserved in the form of a search index in combination with the locations of the tags immediately before these words. Thus when any of the words in the document is designated as the target word, the embodiment makes it possible immediately to search for and retrieve the reference units which contain the target word and which are delimited by tags.

Although the description above contains many specificities, these should not be construed as limiting the scope of the invention but as merely providing illustrations of the presently preferred embodiments of this invention. For example, whereas the above-described embodiments retrieve and store all words of structured documents, it is clear that a given category of words alone (e.g., grouped by part of speech) may be selected and stored for subsequent search and retrieval. In such cases, it is possible to exclude words that may not clearly manifest the characteristic to be searched for.

Thus the scope of the invention should be determined by the appended claims and their legal equivalents, rather than by the examples given.

What is claimed is:

1. A structured document searching apparatus comprising:

document inputting means for inputting a structured document including reference units delimited by tags;

dividing means for dividing into reference units the structured document input by said document inputting means;

word extracting means for extracting words from said reference units divided by said dividing means;

tuple generating means for generating tuples comprising the locations of said reference units divided by said dividing means and the words extracted by said word extracting means from said reference units;

search index generating means which, given the tuples generated by said tuple generating means out of the locations of said reference units and the words from said reference units, generates a search index comprising said words and said locations of said reference units including said words; and storing means for storing said search index, generated by said search index generating means, in conjunction with said structured document input by said document inputting means.

2. A structured document searching apparatus according to claim 1, further comprising:

searching means which, when a target word is input, searches for said target word through the words within said search index generated by said search index generating means; and displaying means which, when said searching means detects said target word in a reference unit, displays the content of said reference unit including said target word within said structured document stored by said storing means in conjunction with said search index, the display being made by use of the location of said reference unit comprising said target word.

3. A structured document searching apparatus according to claim 1, wherein said reference units of any structured document input by said document inputting means include a reference unit type identification field each;

wherein said word extracting means extracts as word-field pairs the words from and the fields of said reference units, said reference units having been separated by said dividing means;

wherein said tuple generating means generates tuples each comprising the location of each reference unit separated by said dividing means and the word-field pairs extracted from that reference unit by said word extracting means; and wherein said search index generating means generates, out of the tuples each generated by said tuple generating means and comprising the location of each reference unit and the word-field pairs extracted from that reference unit, a search index including said word-field pairs and the locations of said reference units comprising the words within said word-field pairs.

4. A structured document searching apparatus according to claim 3, further comprising:

searching means which, when a target word-field pair is input, searches for said target word-field pair through the word-field pairs in said search index generated by said search index generating means; and displaying means which, when said searching means detects said target word-field pair in a reference unit, displays the content of said reference unit including the detected word within said structured document stored by said storing means in conjunction with said search index, the display being made by use of the location of said reference unit comprising said target word-field pair.

5. A structured document searching apparatus according to claim 1, wherein the reference units of said structured document input by said document inputting means comprise pairs of reference unit attributes and the values corresponding thereto; and wherein said word extracting means extracts as words the pairs of reference unit attributes and the corresponding attribute values from the reference units separated by said dividing means.

6. A structured document searching apparatus according to claim 5, further comprising:

searching means which, when a target attribute and the attribute value corresponding thereto are input, searches for said target attribute and for the corresponding attribute value through the pairs of attributes and attribute values in said search index generated by said search index generating means; and displaying means which, when said searching means detects said target attribute and the value thereof in a reference unit, displays the content of said reference unit including the detected pair of attribute and attribute value within said structured document stored by said storing means in conjunction with said search index, the display being made by use of the location of said reference unit comprising the detected pair of attribute and attribute value.

7. A structured document searching apparatus according to claim 3, wherein the reference units of said structured document input by said document inputting means comprise pairs of reference unit attributes and the values corresponding thereto; and wherein said word extracting means extracts as words the pairs of reference unit attributes and attribute values from the reference units separated by said dividing means.

8. A structured document searching apparatus according to claim 7, further comprising:

searching means which, when a target attribute and the attribute value corresponding thereto are input, searches for said target attribute and for the corresponding attribute value through the pairs of attributes and attribute values in said search index generated by said search index generating means; and displaying means which, when said searching means detects said target attribute and the value thereof in a reference unit, displays the content of said reference unit including the detected pair of attribute and attribute value within said structured document stored by said storing means in conjunction with said search index, the display being made by use of the location of said reference unit comprising the detected pair of attribute and attribute value.

9. A structured document searching method for use with a structured document searching apparatus, the method comprising the steps of:

(a) inputting a structured document including reference units delimited by tags;

(b) dividing into reference units the structured document input in the step (a);

(c) extracting words from said reference units divided in step (b);

(d) generating tuples comprising the locations of said reference units divided in the step (b) and the words extracted in the step (c) from said reference units;

(e) given the tuples generated in the step (d) out of the locations of said reference units and the words from said reference units, generating a search index comprising said words and said locations of said reference units including said words; and (f) storing said search index, generated in the step (e), in conjunction with said structured document input in the step (a).

10. A structured document searching method according to claim 9, further comprising the steps of:

(g) when a target word is input, searching for said target word through the words within said search index generated in the step (e); and (h) when said target word is detected in a reference unit in the step (g), displaying the content of said reference unit including said target word within said structured document stored in the step (f) in conjunction with said search index, the display being made by use of the location of said reference unit comprising said target word.

* * * * *